(12) United States Patent
Sun et al.

(10) Patent No.: US 9,914,394 B2
(45) Date of Patent: Mar. 13, 2018

(54) REARVIEW MIRROR

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Shenglin Sun, Beijing (CN); Feng Bai, Beijing (CN); Yun Qiu, Beijing (CN); Zhidong Wang, Beijing (CN); Junguo Liu, Beijing (CN); Zhiguo Chen, Beijing (CN); Lihua Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 8 days.

(21) Appl. No.: 14/906,012

(22) PCT Filed: Aug. 19, 2015

(86) PCT No.: PCT/CN2015/087511
§ 371 (c)(1),
(2) Date: Jan. 19, 2016

(87) PCT Pub. No.: WO2016/134588
PCT Pub. Date: Sep. 1, 2016

(65) Prior Publication Data
US 2016/0368423 A1 Dec. 22, 2016

(30) Foreign Application Priority Data
Feb. 28, 2015 (CN) .......................... 2015 1 0090785

(51) Int. Cl.
*G02B 26/00* (2006.01)
*B60R 1/08* (2006.01)
(Continued)

(52) U.S. Cl.
CPC ............ *B60R 1/088* (2013.01); *G02B 6/0011* (2013.01); *G02B 26/005* (2013.01); *G02B 26/02* (2013.01)

(58) Field of Classification Search
CPC .... B60R 1/088; G02B 26/004; G02B 26/005; G02B 26/02
(Continued)

(56) References Cited

U.S. PATENT DOCUMENTS

2010/0067093 A1 3/2010 Feil et al.
2011/0141389 A1* 6/2011 Tabor ................ G02F 1/133308
349/58
2015/0022543 A1* 1/2015 Nelson ................ B60R 1/088
345/589

FOREIGN PATENT DOCUMENTS

CN 101355837 A 1/2009
CN 201400132 Y 2/2010
(Continued)

OTHER PUBLICATIONS

International Search Report dated Aug. 19, 2015 corresponding to International application No. PCT/CN2015/087511.
(Continued)

*Primary Examiner* — Mahidere Sahle
(74) *Attorney, Agent, or Firm* — Nath, Goldberg & Meyer; Joshua B. Goldberg; Annie Kock

(57) ABSTRACT

The present invention provides a rearview mirror comprising a panel and a control circuit, a first substrate in the panel is provided with a planar transparent electrode layer, a second substrate is provided with a transparent hydrophobic material layer and multiple block electrodes, a side of the transparent hydrophobic material layer facing the first sub-
(Continued)

strate is provided with multiple cells, lightproof electro-wetting ink is provided within each cell, the block electrodes are provided on a side of the transparent hydrophobic material layer away from the first substrate and can at least reflect part of light entering the rearview mirror from first substrate side, the control circuit is configured to control area of each cell covered by the electro-wetting ink in the cell by controlling a change in intensity of the electric field between the planar transparent electrode layer and the block electrodes.

17 Claims, 3 Drawing Sheets

(51) Int. Cl.
    *G02B 26/02*     (2006.01)
    *F21V 8/00*     (2006.01)

(58) Field of Classification Search
    USPC .................................................. 359/290–297
    See application file for complete search history.

(56) References Cited

FOREIGN PATENT DOCUMENTS

| | | |
|---|---|---|
| CN | 102062983 A | 5/2011 |
| CN | 102652280 A | 8/2012 |
| CN | 203211203 U | 9/2013 |
| CN | 104330891 A | 2/2015 |
| CN | 104656247 A | 5/2015 |
| WO | 2010062163 A1 | 6/2010 |
| WO | 2012118366 A1 | 9/2012 |

OTHER PUBLICATIONS

Written Opinion of the International Searching Authority dated Aug. 19, 2015 corresponding to International application No. PCT/CN2015/087511.

Office Action dated Jun. 23, 2016 issued in corresponding Chinese Application No. 201510090785.0.

\* cited by examiner

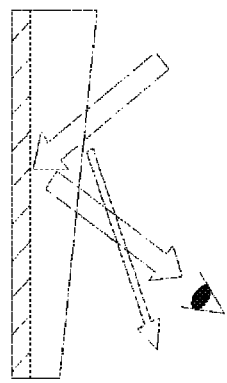
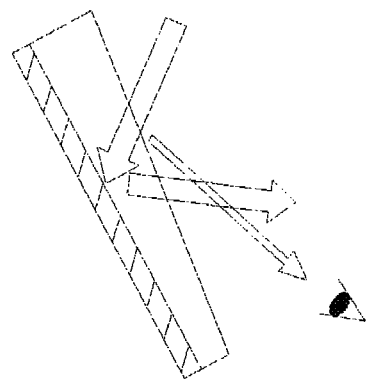
Fig. 1a        Fig. 1b
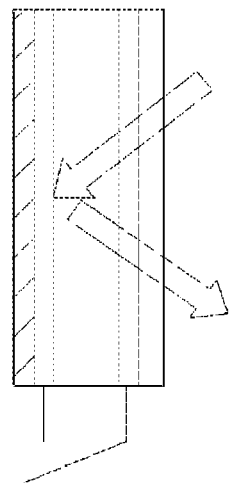
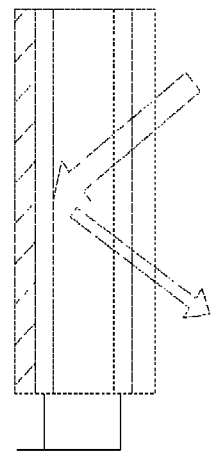
Fig. 2a        Fig. 2b

REARVIEW MIRROR

This is a National Phase Application filed under 35 U.S.C. 371 as a national stage of PCT/CN2015/087511, filed Aug. 19, 2015, an application claiming the benefit of Chinese Application No. 201510090785.0, filed Feb. 28, 2015, the content of each of which is hereby incorporated by reference in its entirety.

FIELD OF THE INVENTION

The present invention relates to vehicle accessories, in particular to a rearview mirror.

BACKGROUND OF THE INVENTION

A rearview mirror, as a very important safety aid facility for a vehicle driver, functions as viewing the condition behind a vehicle. However, in the case of being irradiated by a headlamp of a vehicle behind during driving at night, the rearview mirror may generate intensive reflective light, thereby dazzling the driver and influencing the safe driving of the driver. Therefore, a rearview mirror having an anti-glare function has been developed.

Existing anti-glare rearview mirrors are mainly classified into two categories: mechanical anti-glare rearview mirrors (as shown in FIG. 1a and FIG. 1b) and electrochromic anti-glare rearview mirrors (as shown in FIG. 2a and FIG. 2b).

The working principle of the mechanical anti-glare rearview mirrors is reducing light reflected into human eyes by adjusting the position or angle of a rearview mirror so as to realize the anti-glare function. FIG. 1a shows a principle diagram when a mechanical anti-glare rearview mirror is in a normal working state, where almost all light incident into the rearview mirror is reflected into human eyes. FIG. 1b shows a working principle diagram when the mechanical anti-glare rearview mirror is in an anti-glare working state, where the mechanical anti-glare rearview mirror in the anti-glare working state is rotated upward by a certain angle relative to the normal working state shown in FIG. 1a, so that a small part of light incident into the rearview mirror is reflected into the human eyes, and the purpose of preventing a driver from being dazzled is thus achieved.

The working principle of the electrochromic anti-glare rearview mirrors is reducing light reflected into human eyes by controlling the discoloration of a discoloring and reflecting layer in a rearview mirror through a change in voltage, so as to realize the anti-glare function. FIG. 2a shows a principle diagram when an electrochromic anti-glare rearview mirror is in a normal working state. As shown, as the electrochromic anti-dazzle rearview mirror does not apply a voltage to its discoloring and reflecting layer, light entering the rearview mirror is completely reflected by the discoloring and reflecting layer. FIG. 2b shows a principle diagram when the electrochromic anti-glare rearview mirror is in an anti-glare working state. As shown, the electrochromic anti-dazzle rearview mirror applies a voltage to its discoloring and reflecting layer when being irradiated by intensive light, and the discoloring and reflecting layer discolors due to chemical reaction therein under the action of the voltage, so that one part of light entering the rearview mirror is absorbed by the discoloring and reflecting layer while the other part of light is reflected into human eyes, thereby achieving the purpose of reducing light reflected into the human eyes to prevent a driver from being dazzled. Due to simple process, easy operation and good anti-glare effect, electrochromic anti-glare rearview mirrors are widely used and have become a mainstream in the current market.

However, as the electrochromic anti-glare rearview mirrors realize the anti-glare function by chemical reactions, the anti-glare response time is long due to a slow discoloring speed, and the reliability is low.

SUMMARY OF THE INVENTION

An objective of the present invention is to provide a rearview mirror which has reliable anti-glare function and rapid anti-glare operation response.

To achieve the above objective, the present invention provides a rearview mirror, including a panel and a control circuit, wherein the panel includes a first substrate and a second substrate arranged in an aligned manner, the first substrate is located at a light incident/emergent side of the rearview mirror relative to the second substrate, the first substrate includes a first transparent base substrate and a planar transparent electrode layer stacked on the first transparent base substrate, the second substrate includes a second base substrate and a transparent hydrophobic material layer and a plurality of block electrodes stacked on the second base substrate, a side of the transparent hydrophobic material layer facing the first substrate is provided with a plurality of cells, each of which is provided with lightproof electrowetting ink therein, the plurality of block electrodes are provided on a side of the transparent hydrophobic material layer away from the first substrate, each of the block electrodes corresponds to one of the cells, and the block electrodes are at least able to reflect a part of light entering the rearview mirror from the first substrate side, and the control circuit is electrically connected to the planar transparent electrode layer and the plurality of block electrodes and configured to respectively provide voltages to the planar transparent electrode layer and the plurality of block electrodes to form an electric field between the planar transparent electrode layer and the plurality of block electrodes, so as to control an area of each of the cells covered by the electro-wetting ink in the cell by controlling a change in intensity of the electric field.

Preferably, the second substrate further includes a switch element array comprising a plurality of switch elements, each of which corresponds to one of the block electrodes, and the control circuit provides a voltage to each of the block electrodes through the corresponding switch element.

Preferably, the block electrodes are transflective electrodes.

Preferably, the rearview further includes a backlight source, which is provided in a layer in the second substrate away from the first substrate relative to both the plurality of block electrodes and the switch element array.

Preferably, the backlight source includes a light guide plate and a reflector plate arranged in a stacked manner.

Preferably, the second substrate further includes a color filter layer comprising a plurality of color resisting blocks, each of which corresponds to one of the cells.

Preferably, the color filter layer is provided between the switch element array and the backlight source.

Preferably, the panel further includes transparent liquid filled between the first substrate and the second substrate, and the transparent liquid is immiscible with the electro-wetting ink.

Preferably, the rearview mirror further includes a brightness sensor configured to detect a change in brightness around the rearview mirror, when the brightness sensor detects that the change in brightness around the rearview mirror is less than a first predetermined value, the brightness sensor sends a first sensing signal to the control circuit, and the control circuit controls the intensity of the electric field between the planar transparent electrode layer and the block electrodes to be a first value upon receipt of the first sensing signal, so that the area covered by the electro-wetting ink in each of the cells is a first predetermined area; and when the brightness sensor detects that the change in brightness around the rearview mirror exceeds the first predetermined value, the brightness sensor sends a second sensing signal to the control circuit, and the control circuit controls the intensity of the electric field between the planar transparent electrode layer and the block electrodes to be a second value upon receipt of the second sensing signal, so that the area covered by the electro-wetting ink in each of the cells is a second predetermined area, the second predetermined area being larger than the first predetermined area.

Preferably, when the brightness sensor detects that the change in brightness around the rearview mirror exceeds a second predetermined value, the brightness sensor sends a third sensing signal to the control circuit, and the control circuit controls the intensity of the electric field between the planar transparent electrode layer and the block electrodes to be a third value upon receipt of the third sending signal, so that more than one but less than all of the cells are fully covered by the electro-wetting ink, the second predetermined value being larger than the first predetermined value.

By changing the intensity of the electric field between the block electrodes and the planar electrode, the shape of the electro-wetting ink can vary rapidly and reliably, so that the quantity of light reflected by the rearview mirror is controlled. Therefore, the rearview mirror provided by the present invention has better stability and may realize quick switchover between a normal working mode and an anti-glare working mode.

BRIEF DESCRIPTION OF THE DRAWINGS

The accompanying drawings, which constitute a part of the description, are used for providing further understanding of the present invention, and explaining the present invention together with the following specific implementations, rather than limiting the present invention, in which:

FIG. 1a is a principle diagram when a mechanical anti-glare rearview mirror is in a normal working state;

FIG. 1b is a principle diagram when the mechanical anti-glare rearview mirror is in an anti-glare working state;

FIG. 2a is a principle diagram when an electrochromic anti-glare rearview mirror is in a normal working state;

FIG. 2b is a principle diagram when the electrochromic anti-glare mirror is in an anti-glare working state;

DESCRIPTION OF THE PREFERRED EMBODIMENT

The specific implementations of the present invention will be described below in detail with reference to the accompanying drawings. It should be understood that the specific implementations described herein are merely used for describing and explaining the present invention and not intended to limit the present invention.

Figure 3A:
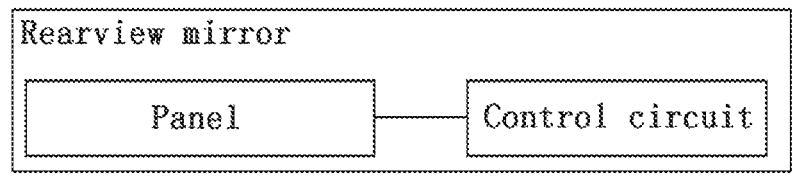
FIG. 3a is a functional block diagram of a rearview mirror provided by the present invention.
Figure 3:
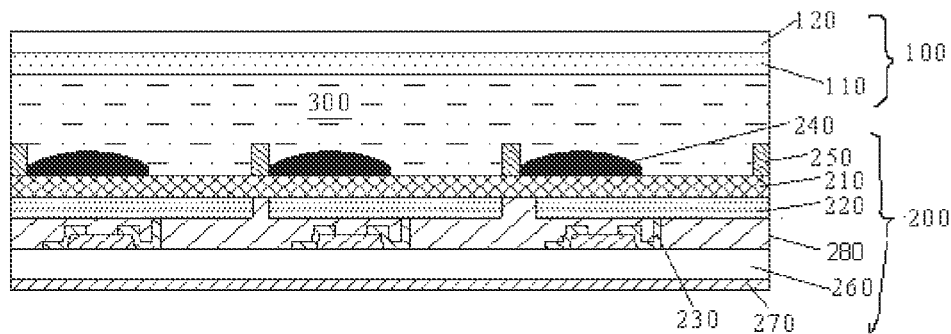
FIG. 3 is a structural schematic diagram of a first implementation of a panel of the rearview mirror provided by the present invention.
Figure 4:
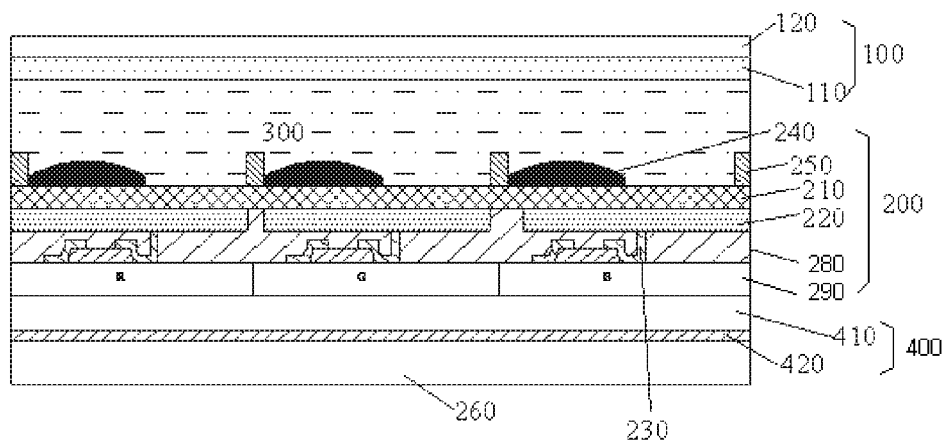
FIG. 4 is a structural schematic diagram of a second implementation of the panel of the rearview mirror provided by the present invention.

The present invention provides a rearview mirror which, as shown in FIG. 3a, includes a panel and a control circuit. As shown in FIG. 3 and FIG. 4, the panel includes a first substrate 100 and a second substrate 200 arranged in an aligned manner, and the first substrate 100 is located at a light incident/emergent side of the rearview mirror relative to the second substrate 200. The first substrate 100 includes a first transparent base substrate 120 and a planar transparent electrode layer 110 disposed on the first transparent base substrate 120. The second substrate 200 includes a second base substrate 260 and a transparent hydrophobic material layer 210 and a plurality of block electrodes 220 disposed on the second base substrate 260. A side of the hydrophobic material layer 210 facing the first substrate 100 is provided with a plurality of cells. In the illustrated example, the cells are formed by providing cell side walls 250 on the hydrophobic material layer 210, but the present invention is not limited to this exemplary structure and may employ any way to form the plurality of cells. For example, it is also possible to etch a plurality of cells in the hydrophobic material layer 210. Lightproof electro-wetting ink 240 is provided within each of the cells. The plurality of block electrodes 220 are provided on one side of the transparent hydrophobic material layer 210 away from the first substrate 100, and each of the block electrodes 220 corresponds to one of the cells. The block electrodes 220 may be made of a reflective material and thus, can at least reflect a part of light incident into the rearview mirror from first substrate 100 side. The control circuit is electrically connected to the planar transparent electrode layer 110 and the plurality of block electrodes 220 and configured to respectively provide voltages to the planar transparent electrode layer 110 and the plurality of block electrodes 220 to form an electric field between the planar transparent electrode layer 110 and the plurality of block electrodes 220, so as to control an area of each of the cells covered by the electro-wetting ink 240 in the cell by controlling a change of the electric field.

It should be explained that the "electro-wetting ink" used herein is lightproof and can completely absorb light incident thereto. Moreover, when the electro-wetting ink is in an electric field, the surface tension of the electro-wetting ink will change with the change in intensity of the electric field, so that the base area of the electro-wetting ink with a certain volume varies. Thereby, the area of each cell covered by the electro-wetting ink is changed by controlling the intensity of the electric field.

For the electro-wetting ink having some components, when the voltage difference between two sides of the electro-wetting ink 240 in an electric field increases (that is, the intensity of the electric field increases), the surface tension of the electro-wetting ink becomes larger, and the electro-wetting ink condenses into an ink droplet having a larger thickness and a smaller floor area, so that the area covered by the electro-wetting ink 240 becomes smaller. However, when the voltage difference between two sides of the electro-wetting ink 240 in the electric field decreases (that is, the intensity of the electric field decreases), the surface tension of the electro-wetting ink becomes smaller, and the electro-wetting ink spreads to form an ink droplet having a smaller thickness and a larger floor area, so that the area covered by the electro-wetting ink 240 becomes larger. For convenience of description and consistency, the exemplary embodiments described herein are generally discussed by taking such case as an example. However, those skilled in the art can easily understand that there may be different features for electro-wetting ink having different components and the control mode thereof may be accordingly adjusted.

For example, for the electro-wetting ink having other components, when the voltage difference between two sides of the electro-wetting ink 240 in an electric field increases, the surface tension of the electro-wetting ink becomes smaller, and the electro-wetting ink spreads to form an ink layer having a smaller thickness and a larger floor area, so that the area covered by the electro-wetting ink 240 becomes larger. However, when the voltage difference between two sides of the electro-wetting ink 240 in the electric field decreases, the surface tension of the electro-wetting ink becomes larger, and the electro-wetting ink condenses into an ink droplet having a larger thickness and a smaller floor area, so that the area covered by the electro-wetting ink 240 becomes smaller.

The purpose of providing the hydrophobic material layer 210 lies in that the electro-wetting ink 240 is enabled to move unimpededly.

Here, the expression "block electrodes 220 can at least reflect a part of light" includes two cases: in the first case, light irradiated on the block electrodes 220 from the outside of the rearview mirror is completely reflected; and in the second case, a part of light irradiated on the block electrodes 220 from the outside of the rearview mirror is reflected, whereas the other part of the light passes through the block electrodes 220. In the first case, it is unnecessary to provide a reflecting layer for the rearview mirror, and the block electrodes 220 may function as the reflecting layer. In the second case, whether the rearview mirror is additionally provided with a reflecting layer may be determined according to the actually required light reflection quantity. If the used block electrodes 220 reflect an enough quantity of light to realize the operation of the rearview mirror in the normal mode, it is unnecessary to additionally provide a reflecting layer for the rearview mirror; however, if the rearview mirror requires a high light reflection quantity in the normal mode and the light reflection quantity of the used block electrodes 220 cannot meet the requirement, preferably, the rearview mirror may further be provided with a reflecting layer. For example, a reflecting layer may be provide on one side of the second base substrate 260 away from the light incident/emergent side of the rearview mirror so that a reflecting surface of the reflecting layer faces the light incident/emergent side of the rearview mirror. Alternatively, preferably, in the rearview mirror provided in the first implementation shown in FIG. 3, the second substrate 200 may include a transparent second base substrate 260 and a reflecting layer 270 disposed on one side of the second base substrate 260 away from the light incident/emergent side of the rearview mirror. The reflecting layer 270 is configured to reflect light passing through the block electrodes 220, so that the light exits to the outside from the light emergent side of the rearview mirror.

Figure 6:
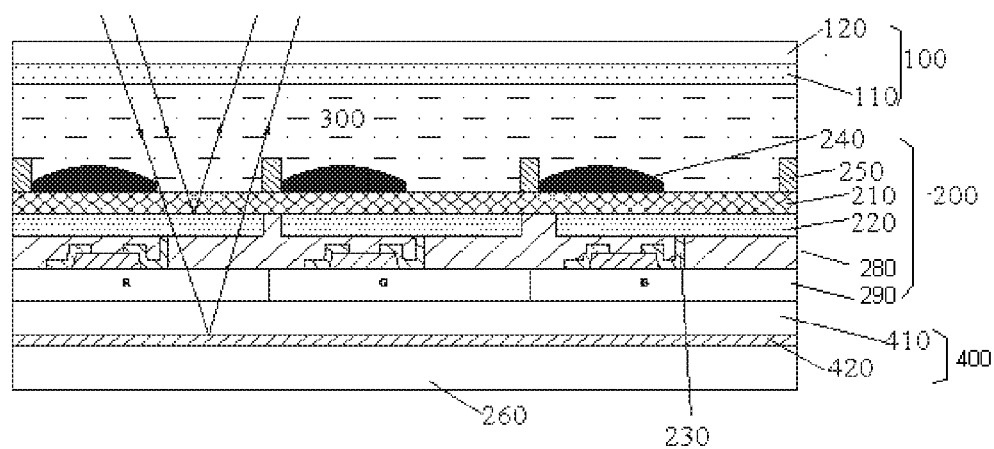
FIG. 6 is a diagram illustrating working principle of the panel when the rearview mirror shown in FIG. 4 is in a normal working mode.

When the rearview mirror is in a normal working mode, as shown in FIG. 6, certain voltages are respectively applied to the block electrodes 220 and the planar transparent electrode 110, which are electrically connected to the control circuit, through the control circuit, so that a relatively large voltage difference is generated between the block electrodes 220 and the planar transparent electrode 110, and the electro-wetting ink 240 has a large surface tension and occupies a small area in each cell. Light from the outside of the rearview mirror enters into the rearview mirror from the light incident side, passes through portions of the cells not covered by the electro-wetting ink 240 and irradiates onto the surfaces of the block electrodes 220, and then is reflected by the block electrodes 220 and exits from the rearview mirror from the light emergent side to enter human eyes, so that a driver can clearly view the road condition behind a vehicle.

Figure 7:
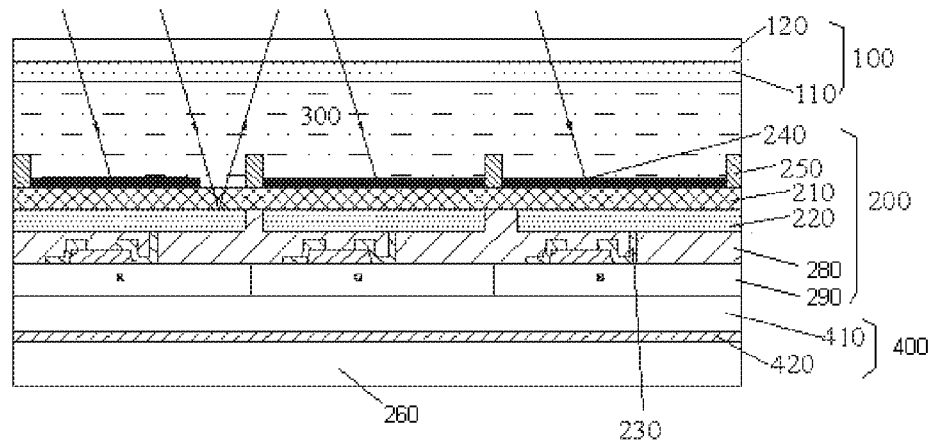
FIG. 7 is a diagram illustrating working principle of the panel when the rearview mirror shown in FIG. 4 is in an anti-glare working mode.

When the rearview mirror is in an anti-glare working mode, as shown in FIG. 7, by changing the voltages respectively applied to the block electrodes 220 and the planar transparent electrode 110 by the control circuit, a relatively small voltage difference is generated between the block electrodes 220 and the planar transparent electrode 110, and the electro-wetting ink 240 has a smaller surface tension and nearly spreads all over each cell. Light from the outside of the rearview mirror enters into the rearview mirror from the light incident side, then majority of the light is absorbed by the electro-wetting ink. 240, whereas only a small part of the light reaches the block electrodes 220 through clearances between the electro-wetting ink and the cell side walls 250 and is then reflected into human eyes by the block electrodes 220, so that the quantity of light entering the human eyes is greatly reduced, and it can prevent a driver from being dazzled and is convenient for the driver to view the road condition behind the vehicle.

As shown, the electro-wetting ink 240 is accommodated in each cell, and the cells are defined by cell side walls 250. In the first substrate 100, the planar transparent electrode 110 may be provided on the side of the first transparent base substrate 120 away from the light incident/emergent side, so that the first transparent base substrate 120 can protect the planar transparent electrode 110.

In the present invention, the advantage of configuring the block electrodes 220 to be "blocks" but not to be a "planar" electrode spreading all over the hydrophobic material layer 210 lies in that the electric fields at different cells may be separately controlled such that the reflection condition of each cell is uniform and stable. Therefore, light is distributed uniformly, the road condition behind a vehicle is truly reflected, adverse effect on the driver due to light reflection occurring only at some positions is avoided, and the reliability of the rearview mirror is thus improved.

By changing the voltage difference between the block electrodes 220 and the planar transparent electrode 110, the shape of the electro-wetting ink 240 can be changed rapidly and reliably. Therefore, the rearview mirror provided by the present invention has better stability and can realize quick switchover between a normal working mode and an anti-glare working mode.

To provide convenient control of the control circuit, preferably, the second substrate may further include an element layer 280 and a switch element array disposed on the element layer 280. The switch element array includes a plurality of switch elements 230, each of which corresponds to one of the block electrodes 220. The control circuit is electrically connected to each of the switch elements 230, respectively, and provides a voltage to the block electrodes through the switch elements 230.

When a switch element 230 is turned on, the control circuit may provide a voltage to the block electrode 220 corresponding to this switch element 230, and when the switch element 230 is turned off, the block electrode 220 corresponding to this switch element 230 cannot receives a voltage.

The reflectivities of the rearview mirror at different positions may be separately controlled by controlling the on/off of the switch elements 230.

Preferably, the switch elements 230 may be thin film transistors. As shown in FIGS. 3 to 7, the drains of the switch elements 230 are connected to the corresponding block elements 220. It should be explained that, although not shown, the second substrate 200 further includes a plurality of gate lines and a plurality of data lines, the plurality of grid lines and the plurality of data lines intersect with each other to divide the second substrate into a plurality of pixel units, each of which is provided therein with one switch element 230. The arrangement mode of the gate lines and data lines in the second substrate 200 is similar to that of gate lines and data lines of an array substrate for a display device in the prior art and will not be repeated here. Additionally, preferably, if the element layer 280 is disposed closer to the light incident/emergent side of the rearview mirror relative to the block electrodes 220, or if the element layer 280 is disposed closer to the light incident/emergent side of the rearview side relative to a reflecting layer 270 in the above-described case of additionally providing the reflecting layer 270 in order to compensate the insufficient light reflection quantity of the block electrodes 220, it is preferable to use a transparent element layer to form this element layer 280 to reduce blockage to the incident light.

As a preferred implementation of the present invention, the block electrodes 220 are transflective electrodes.

As a second implementation of the present invention, as shown in FIG. 4, the rearview mirror further includes a backlight source 400 disposed on a side of the switch element array away from the first substrate 100. In the present invention, as the second substrate 200 is divided into a plurality of cells, each of the cells is equivalent to one sub-pixel in a display, the whole rearview mirror may be used for displaying images and it is convenient for a driver to view images through the rearview mirror. In the present invention, a rearview mirror and a display device are combined, so the material cost and manufacturing cost of the rearview mirror having a display function are reduced.

Figure 5:
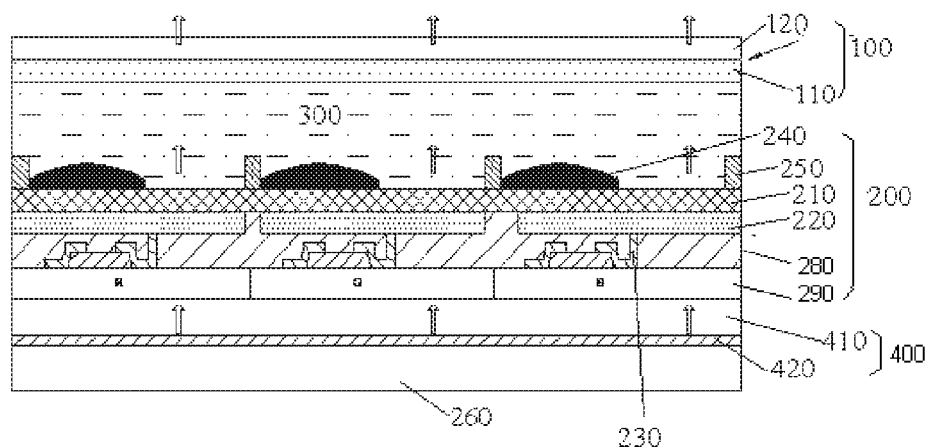
FIG. 5 is a diagram illustrating working principle of the panel when the rearview mirror shown in FIG. 4 is in a display mode.

In a case where the rearview mirror is provided with the backlight source 400, the rearview mirror can also be used for displaying images. As shown in FIG. 5, when the backlight source 400 is turned on, backlight passes through the block electrodes 220 and is emitted out. By adjusting the area occupied by the electro-wetting ink 240 in each cell, the quantity of emergent light of each cell may be adjusted, so that the purpose of displaying images may be achieved. As the block electrodes 220 are transflective, light emitted from the backlight source 400 may pass through the block electrodes 220.

As a specific implementation of the present invention, as shown in FIG. 5, the backlight source 400 may include a light guide plate 410 and a reflector plate 420 arranged in a stacked manner.

Here, the reflector plate 420 has dual functions. The first function of the reflector plate 420 is to increase backlight brightness when the rearview mirror is in a display mode. The second function of the reflector plate 420 is to reflect light reaching the reflector plate 420 through the transflective block electrodes 220 when the rearview mirror is in a normal working mode and an anti-glare working mode, so that the brightness of the rearview mirror is improved to a certain extent.

In order to allow the rearview mirror to display colorful images, preferably, the second substrate 200 further includes a color filter layer 290, and the color filter layer includes a plurality of color resisting blocks, each of which corresponds to one of the cells.

In the implementation shown in FIG. 4, the color filter layer 290 includes color resisting blocks of three colors, i.e., red color resisting blocks R, green color resisting blocks G and blue color resisting blocks B. It is easily understood that the color filter layer 290 may include color resisting blocks of four colors.

Preferably, the color filter layer 290 may be provided between the element layer 280 and the backlight source 400. Specifically, the color filter layer 290 may be provided on the light guide plate 410.

In order to prevent the electro-wetting ink from flowing out of the cells, preferably, the panel further includes transparent liquid 300 filled between the first substrate 100 and the second substrate 200, and the transparent liquid 300 is immiscible with the electro-wetting ink 240. As an implementation of the present invention, the transparent liquid may be water.

In the present invention, the working mode of the rearview mirror may be set artificially. For example, when a vehicle is in a parked state, the backlight source 400 may be turned on artificially, and an image signal is provided to the rearview mirror, so that the rearview mirror is in a display working mode. During driving in the daytime, the backlight source 400 may be turned off artificially, and the rearview mirror is set to be in a normal working mode, that is, the voltage difference in each cell is controlled to be large by using the control circuit, so that the electro-wetting ink 240 in each cell condenses into a small sphere. During driving at night, the backlight source 400 may be turned off artificially, and the rearview mirror is set to be in an anti-glare mode, that is, the voltage difference in each cell is controlled to be less than that in the normal working mode by using the control circuit, so that the electro-wetting ink in each cell spreads and thus covers a relatively large area of the cell.

In order to intelligently adjust the working mode of the rearview mirror, preferably, the rearview mirror further includes a brightness sensor configured to detect a change in brightness around the rearview mirror.

When the brightness sensor detects that the change in brightness around the rearview mirror is less than a first predetermined value, the brightness sensor sends a first sensing signal to the control circuit, and the control circuit controls the voltage difference between the planar transparent electrode layer and the block electrodes to be a large value upon receipt of the first sensing signal, so that the area covered by the electro-wetting ink in each of the cells is a first predetermined area.

When the brightness sensor detects that the change in brightness around the rearview mirror exceeds the first predetermined value, the brightness sensor sends a second sensing signal to the control circuit, and the control circuit controls the voltage difference between the planar transparent electrode layer and the block electrodes to be a small value upon receipt of the second sensing signal, so that the area covered by the electro-wetting ink in each of the cells is a second predetermined area. The second predetermined area is larger than the first predetermined area.

When the change in brightness around the rearview mirror is less than the first predetermined value, it is indicated that no intensive light irradiates behind the vehicle, therefore, majority of light irradiated on the rearview mirror may be reflected into human eyes, and this state is the normal working mode shown in FIG. 6. When the change in brightness around the rearview mirror is larger than the first predetermined value, it is indicated that intensive light irradiates behind the vehicle, therefore, a small part of light irradiated on the rearview mirror may be reflected into the human eyes, and this state is the anti-glare working mode shown in FIG. 7.

In the case where the brightness sensor is provided, the rearview mirror can realize an intelligent adjustment working mode, and thus the safety of driving is improved.

Further preferably, when the brightness sensor detects that the change in brightness around the rearview mirror exceeds a second predetermined value, the brightness sensor sends a third sensing signal to the control circuit, and the control circuit controls the voltage difference between the planar transparent electrode layer and the block electrodes to be a minimum value upon receipt of the third sending signal, so that more than one but less than all of the cells are fully covered by the electro-wetting ink. The second predetermined value is larger than the first predetermined value.

Here, the "more than one but less than all of the cells" means that at least one but not all of the cells are fully covered by the electro-wetting.

When the change in brightness around the rearview mirror exceeds the second predetermined value, the intensity of light from a vehicle behind is too high, so the electro-wetting ink may be controlled to completely cover a part of the cells, and light reflected by the rearview mirror is thus reduced.

It should be understood that the foregoing implementations are merely exemplary implementations for describing the principle of the present invention, but the present invention is not limited thereto. A person of ordinary skill in the art may make various modifications and improvements without departing from the spirit and essence of the present invention, and these modifications and improvements shall fall into the protection scope of the present invention.

The invention claimed is:

1. A rearview mirror, comprising a panel and a control circuit, wherein the panel comprises a first substrate and a second substrate arranged in an aligned manner, the first substrate is located at a light incident/emergent side of the rearview mirror relative to the second substrate, the first substrate comprises a first transparent base substrate and a planar transparent electrode layer stacked on the first transparent base substrate, the second substrate comprises a second base substrate and a transparent hydrophobic material layer and a plurality of block electrodes stacked on the second base substrate, a side of the transparent hydrophobic material layer facing the first substrate is provided with a plurality of cells, each of which is provided with lightproof electro-wetting ink therein, the plurality of block electrodes are provided on a side of the transparent hydrophobic material layer away from the first substrate, each of the block electrodes corresponds to one of the cells, the block electrodes are at least able to reflect a part of light entering the rearview mirror from the first substrate side, and the control circuit is electrically connected to the planar transparent electrode layer and the plurality of block electrodes and configured to respectively provide voltages to the planar transparent electrode layer and the plurality of block electrodes to form an electric field between the planar transparent electrode layer and the plurality of block electrodes, so as to control an area of each of the cells covered by the electro-wetting ink in the cell by controlling a change in intensity of the electric field, wherein the second substrate further comprises a switch element array between the block electrodes and the second base substrate, the switch element array comprising a plurality of switch elements, each of which corresponds to one of the block electrodes, and the control circuit provides a voltage to each of the block electrodes through the corresponding switch element, and wherein the second substrate further comprises a reflecting layer, which is disposed at a side of the second base substrate distal to the plurality of block electrodes and further away from the first substrate relative to the plurality of block electrodes.

2. The rearview mirror according to claim 1, wherein the block electrodes are transflective electrodes.

3. The rearview mirror according to claim 2, further comprising a backlight source, which is provided in a layer in the second substrate away from the first substrate relative to both the plurality of block electrodes and the switch element array.

4. The rearview mirror according to claim 3, wherein the backlight source comprises a light guide plate and a reflector plate arranged in a stacked manner.

5. The rearview mirror according to claim 3, wherein the second substrate further comprises a color filter layer comprising a plurality of color resisting blocks, each of which corresponds to one of the cells.

6. The rearview mirror according to claim 5, wherein the color filter layer is provided between the switch element array and the backlight source.

7. The rearview mirror according to claim 1, wherein the panel further comprises transparent liquid filled between the first substrate and the second substrate, and the transparent liquid is immiscible with the electro-wetting ink.

8. The rearview mirror according to claim 1, further comprising a brightness sensor configured to detect a change in brightness around the rearview mirror; wherein, when the brightness sensor detects that the change in brightness around the rearview mirror is less than a first predetermined value, the brightness sensor sends a first sensing signal to the control circuit, and the control circuit controls the intensity of the electric field between the planar transparent electrode layer and the block electrodes to be a first value upon receipt of the first sensing signal, so that the area covered by the electro-wetting ink in each of the cells is a first predetermined area; and when the brightness sensor detects that the change in brightness around the rearview mirror exceeds the first predetermined value, the brightness sensor sends a second sensing signal to the control circuit, and the control circuit controls the intensity of the electric field between the planar transparent electrode layer and the block electrodes to be a second value upon receipt of the second sensing signal, so that the area covered by the electro-wetting ink in each of the cells is a second predetermined area, the second predetermined area being larger than the first predetermined area.

9. The rearview mirror according to claim 8, wherein, when the brightness sensor detects that the change in brightness around the rearview mirror exceeds a second predetermined value, the brightness sensor sends a third sensing signal to the control circuit, and the control circuit controls the intensity of the electric field between the planar transparent electrode layer and the block electrodes to be a third value upon receipt of the third sending signal, so that more than one but less than all of the cells are fully covered by the electro-wetting ink, the second predetermined value being larger than the first predetermined value.

10. The rearview mirror according to claim 1, wherein the panel further comprises transparent liquid filled between the first substrate and the second substrate, and the transparent liquid is immiscible with the electro-wetting ink.

11. The rearview mirror according to claim 1, further comprising a brightness sensor configured to detect a change in brightness around the rearview mirror; wherein,
when the brightness sensor detects that the change in brightness around the rearview mirror is less than a first predetermined value, the brightness sensor sends a first sensing signal to the control circuit, and the control circuit controls the intensity of the electric field between the planar transparent electrode layer and the block electrodes to be a first value upon receipt of the first sensing signal, so that the area covered by the electro-wetting ink in each of the cells is a first predetermined area; and
when the brightness sensor detects that the change in brightness around the rearview mirror exceeds the first predetermined value, the brightness sensor sends a second sensing signal to the control circuit, and the control circuit controls the intensity of the electric field between the planar transparent electrode layer and the block electrodes to be a second value upon receipt of the second sensing signal, so that the area covered by the electro-wetting ink in each of the cells is a second predetermined area, the second predetermined area being larger than the first predetermined area.

12. The rearview mirror according to claim 2, further comprising a brightness sensor configured to detect a change in brightness around the rearview mirror; wherein,
when the brightness sensor detects that the change in brightness around the rearview mirror is less than a first predetermined value, the brightness sensor sends a first sensing signal to the control circuit, and the control circuit controls the intensity of the electric field between the planar transparent electrode layer and the block electrodes to be a first value upon receipt of the first sensing signal, so that the area covered by the electro-wetting ink in each of the cells is a first predetermined area; and
when the brightness sensor detects that the change in brightness around the rearview mirror exceeds the first predetermined value, the brightness sensor sends a second sensing signal to the control circuit, and the control circuit controls the intensity of the electric field between the planar transparent electrode layer and the block electrodes to be a second value upon receipt of the second sensing signal, so that the area covered by the electro-wetting ink in each of the cells is a second predetermined area, the second predetermined area being larger than the first predetermined area.

13. The rearview mirror according to claim 3, further comprising a brightness sensor configured to detect a change in brightness around the rearview mirror; wherein,
when the brightness sensor detects that the change in brightness around the rearview mirror is less than a first predetermined value, the brightness sensor sends a first sensing signal to the control circuit, and the control circuit controls the intensity of the electric field between the planar transparent electrode layer and the block electrodes to be a first value upon receipt of the first sensing signal, so that the area covered by the electro-wetting ink in each of the cells is a first predetermined area; and
when the brightness sensor detects that the change in brightness around the rearview mirror exceeds the first predetermined value, the brightness sensor sends a second sensing signal to the control circuit, and the control circuit controls the intensity of the electric field between the planar transparent electrode layer and the block electrodes to be a second value upon receipt of the second sensing signal, so that the area covered by the electro-wetting ink in each of the cells is a second predetermined area, the second predetermined area being larger than the first predetermined area.

14. The rearview mirror according to claim 11, wherein, when the brightness sensor detects that the change in brightness around the rearview mirror exceeds a second predetermined value, the brightness sensor sends a third sensing signal to the control circuit, and the control circuit controls the intensity of the electric field between the planar transparent electrode layer and the block electrodes to be a third value upon receipt of the third sending signal, so that more than one but less than all of the cells are fully covered by the electro-wetting ink, the second predetermined value being larger than the first predetermined value.

15. The rearview mirror according to claim 12, wherein, when the brightness sensor detects that the change in brightness around the rearview mirror exceeds a second predetermined value, the brightness sensor sends a third sensing signal to the control circuit, and the control circuit controls the intensity of the electric field between the planar transparent electrode layer and the block electrodes to be a third value upon receipt of the third sending signal, so that more than one but less than all of the cells are fully covered by the electro-wetting ink, the second predetermined value being larger than the first predetermined value.

16. The rearview mirror according to claim 1, wherein, when the brightness sensor detects that the change in brightness around the rearview mirror exceeds a second predetermined value, the brightness sensor sends a third sensing signal to the control circuit, and the control circuit controls the intensity of the electric field between the planar transparent electrode layer and the block electrodes to be a third value upon receipt of the third sending signal, so that more than one but less than all of the cells are fully covered by the electro-wetting ink, the second predetermined value being larger than the first predetermined value.

17. The rearview mirror according to claim 13, wherein, when the brightness sensor detects that the change in brightness around the rearview mirror exceeds a second predetermined value, the brightness sensor sends a third sensing signal to the control circuit, and the control circuit controls the intensity of the electric field between the planar transparent electrode layer and the block electrodes to be a third value upon receipt of the third sending signal, so that more than one but less than all of the cells are fully covered by the electro-wetting ink, the second predetermined value being larger than the first predetermined value.

* * * * *